United States Patent
Blauth (10) Patent No.: US 12,122,614 B2
(45) Date of Patent: Oct. 22, 2024

(54) DEFLECTION ELEMENT

(71) Applicant: Wipotec GmbH, Kaiserslautern (DE)

(72) Inventor: Thorsten Blauth, Katzweiler (DE)

(73) Assignee: Wipotec GmbH, Kaiserslautern (DE)

( * ) Notice: Subject to any disclaimer, the term of this patent is extended or adjusted under 35 U.S.C. 154(b) by 36 days.

(21) Appl. No.: 17/966,040

(22) Filed: Oct. 14, 2022

(65) Prior Publication Data

US 2023/0123578 A1    Apr. 20, 2023

(30) Foreign Application Priority Data

Oct. 15, 2021 (DE) .......................... 102021126860.5

(51) Int. Cl.
*B65G 47/82* (2006.01)
*B65G 15/60* (2006.01)
*B65G 39/04* (2006.01)
*B65G 39/12* (2006.01)

(52) U.S. Cl.
CPC ............. *B65G 47/82* (2013.01); *B65G 15/60* (2013.01); *B65G 39/04* (2013.01); *B65G 39/12* (2013.01)

(58) Field of Classification Search
CPC ........ B65G 47/82; B65G 15/60; B65G 39/04; B65G 39/12
See application file for complete search history.

(56) References Cited

U.S. PATENT DOCUMENTS 2,712,378 A    7/1955 Eggleston
9,611,101 B1 *    4/2017 Wolfe .................... B65G 15/64
11,712,896 B2 *    8/2023 Cook ...................... B41J 2/145
                                                    347/40
2018/0244472 A1    8/2018 Maclachlan
2021/0198048 A1    7/2021 Rich

FOREIGN PATENT DOCUMENTS

| | | |
|---|---|---|
| DE | 10 2018 204 038 A1 | 9/2019 |
| DE | 20 2021 104 227 U1 | 9/2021 |
| JP | S60154308 U | 10/1985 |
| JP | H362015 U | 6/1991 |
| JP | H04-144 814 A | 5/1992 |
| JP | H11-29211 A | 2/1999 |
| WO | 2017062432 A1 | 4/2017 |
| WO | 2020219434 A1 | 10/2020 |

OTHER PUBLICATIONS

German Patent Office Action dated Jul. 7, 2022 in DE 10 2021 126 860.5.
Extended European Search Report issued Mar. 16, 2023 in EP 22200588.6.
Office Action issued Nov. 29, 2023, in Japanese patent application 2022-163268.
Office Action issued Jul. 11, 2024, in Japanese patent application 2022-163268.

* cited by examiner

*Primary Examiner* — James R Bidwell
(74) *Attorney, Agent, or Firm* — Calvert Technology Law, PLLC; Nathan H. Calvert (57) ABSTRACT

A modular deflection unit includes a supporting part extending in a transverse direction, at least one module support positioned along the supporting part and at least two roller modules. Roller axles of the roller modules are received and supported by the at least one module support such that the deflection unit as a whole can be modularly exchanged.

16 Claims, 6 Drawing Sheets

DEFLECTION ELEMENT

TECHNICAL FIELD OF THE INVENTION

The present invention relates to modular deflection units, and belt bodies, other transport devices, and scales that include modular deflection units.

BACKGROUND OF THE INVENTION

Deflection units are used in transport devices comprising a belt body with a transport belt designed as an endless belt, in order to transport products lying thereon by means of the driven belt. On the front and/or rear end of the belt body, the transport belt is deflected by means of the deflection unit. For this purpose, the deflection unit includes at least one roller, around which the transport belt is led.

Various requirements apply to the roller of the transport belt. Broad transport belts, which have to transport heavy loads and/or which have to be strongly pretensioned, require deflection rollers with larger diameter, in order to have sufficient bending strength over the entire width of the transport belt. Diameters of, for example, 60 mm or 80 mm, are known here. However, a larger roller diameter leads to a larger transfer gap between the transport device and a feed or discharge device arranged adjoiningly thereto in the conveying direction and also designed as a transport belt. Smaller products can therefore fall into the transfer gap during the transfer to a belt body with larger roller diameter or the larger roller diameter can at least jeopardize the controlled transfer of smaller products.

Jolting or bouncing of the products which are transferred at the transfer gap can be very disruptive in particular when the belt body forms a preload for a scale and a product resting on the belt body or transported over said belt body by means of the conveyor belt is to be weighed. In the case of an excessively large transfer gap, the product transferred to the belt body can cause a sudden abrupt loading of the scale and disadvantageously lengthen the required settling process for an accurate measurement result or completely prevent the settling within the available measurement time. The latter factor is therefore particularly critical in dynamic weighing with rapidly conveying transport belts, in particular if the products to be weighed have a high weight and a dimension (length, width, diameter) which is large with respect to the length of the transport belt, since, as a result, the measurement time of the scale is correspondingly short or excessively short.

SUMMARY OF THE INVENTION

Therefore, an aim of the invention is to provide deflection units for remedying the mentioned disadvantages, which moreover should be easily replaceable. In addition, flexibility in conveyor width is desirable, so that a deflection unit which can be readily produced in different belt widths can be created, which should also be suitable for simply replacing (retrofitting) conventional deflection units with larger roller diameter used in the field.

Rollers that are stable even for heavier loads, but which nonetheless have a small roller diameter can be implemented by arranging multiple shorter roller modules next to one another, thereby jointly forming a roller group around which the transport belt is led. Such shorter roller modules have a higher bending stiffness than an individual continuous roller of the same diameter and width. In addition, the individual roller modules or the roller group jointly formed by the roller modules are easily replaceable according to a first aspect of the invention, in that each roller module can be detachably fastened by modular supports on a supporting part arranged over the entire conveyor width. The supporting part with the roller modules arranged thereon forms a deflection unit according to the first aspect. Said deflection unit can be arranged or exchanged—on the front and/or rear end of a belt body when viewed in conveying direction—in the field with existing transport devices, for example. By retrofitting, an existing transport device can be upgraded at relatively low cost. A readjustment of a transfer gap is not necessary, as a result of which idle times are considerably reduced.

A modular deflection unit according to the first aspect extends in a deflection unit longitudinal direction which corresponds to a transverse direction Y or conveyor width direction of a conveyor when the deflection unit is connected in an operating position on the conveyor. The conveying direction X extends orthogonally thereto and may be the general direction in which products lying on the conveyor belt can be conveyed. The conveying direction X may be horizontal. A vertical direction Z extends orthogonally to the transverse direction and to the conveying direction.

A deflection unit according to the first aspect includes at least two individually replaceable roller modules. Each roller module has its own roller axle oriented in transverse direction Y and a roller shell rotatably mounted thereon. At least two such roller modules are arranged situated one behind the other in transverse direction Y and thereby jointly form a first roller group. That is, the roller axles in the series of at least two roller modules are oriented end-to-end so as to extend along the deflection unit longitudinal direction. "End-to-end" here means that the ends of two adjacent roller axles in the series of roller modules face each other.

In addition, a deflection unit includes a continuous supporting part in the transverse direction Y for the joint reception of the at least two roller modules. Moreover, at least one module support is provided. The module support is arranged between two roller modules, which are adjacent in transverse direction Y. The module support is used to receive and to support or to clamp the roller axle of at least one of the two roller modules. In the module support, an axle receptacle is provided, into which the end of the roller axle of at least one roller module can be inserted. Preferably, the axle receptacle is cylindrically designed and only slightly larger than the outer diameter of the roller axle to be received. The module support can be connected, according to some implementations of the invention, in a detachable manner to the supporting part. A roller module arranged between two module supports and supported by the module supports can therefore be secured on the supporting part by fastening the two module supports. Additional roller modules can be arranged one behind the other in transverse direction Y, wherein at least one roller support separates roller modules in the transverse direction Y from one another.

A deflection unit may include more than one module support, for example, at least two or three module supports, or a higher number of module supports with roller modules arranged in between. One roller group including multiple shorter and stiff rollers (for example, each 100 mm in length) may "bridge" (e.g., span) a conveyor width of 600 mm to 800 mm or more.

In spite of its small diameter (for example, 20-30 mm), the individual roller modules are stiff due to their shorter axle length in comparison to the conveyor width. Since each roller module has its own axle, individual roller modules can also be easily replaced. In addition, a deflection unit may be broadened, in the transverse direction, modularly in that the required number of individual roller modules is selected depending on the application case and fastened with the associated module supports to a supporting part of suitable length.

The module supports—when viewed in transverse direction Y—may be designed as small as possible so to arrange the roller modules, which are mutually adjacent in transverse direction, or their roller shells with the smallest possible spacing, and thereby to be able to brace the conveyor belt as evenly as possible over the entire conveyor width and deflect it. According to some embodiments of the invention, each module support is designed to receive the two roller axles of two mutually adjacent roller modules. Each module support then supports both an end of the roller axle of a first roller module and also the other end of the roller axle of another roller module adjoining the first roller module in transverse direction Y. For this purpose, the axle receptacle can be designed, for example, as a borehole which completely passes through the module support in transverse direction Y, wherein the end section of the roller axles of the two mutually adjacent roller modules in each case can be inserted from one side or from the opposite other side of the module support in transverse direction Y into the axle receptacle. Alternatively, it would be conceivable to drill a non-continuous bore (e.g., a blind hole) from the two sides of the module support in order to receive in each case one roller axle.

Each module support may be designed to clamp in a rotationally fixed manner the one or two roller axles received by it. For this purpose, in the axle receptacle, a clamping element, which can be detachably loaded by a tensioning element, is provided. The tensioning element can be, for example, a headless screw. The clamping element is arranged in the module support such that it is pushed, by loading with the tensioning element in a radial direction against a roller axle, in order to clamp said roller axle in a rotationally fixed manner in the axle receptacle. Preferably, the clamping element is designed so that, when loaded by means of a tensioning element, it simultaneously clamps in a rotationally fixed manner two mutually adjacent roller axles. Thus, for example, the ends of two roller axles which are adjacent to one another in transverse direction and introduced from two opposite sides into a common axle receptacle can be jointly secured in a rapid and simple manner using only one clamping element arranged in the axle receptacle.

According to some embodiments of the invention, the clamping element is formed by a wall section that is integral with the module support. For example, this can involve a thin material section which adjoins the axle receptacle. The wall section includes a clamping side, which faces the axle ends inserted into the axle receptacle, and a tensioning side, which faces away from the axle ends. Advantageously, the clamping side is simultaneously a portion of the inner wall of a cylindrical borehole that forms the axle receptacle. By loading the tensioning side with the tensioning means, the wall section is sufficiently reversibly deformable so that the clamping side is pushed in a radial direction against the axle ends and firmly clamps the ends in the axle receptacle. These embodiments have the advantage that the clamping element is arranged in the module support.

Each module support can be secured on the supporting part via its own fastening means, for example, by screwing. For this purpose, the supporting part can have fastening positions or insertion positions having a particular design, for example, arranged next to one another at a constant spacing or grid dimension (for example, 100 mm) in the transverse direction Y. At the insertion positions, the supporting part can define recesses, into which the module supports can be inserted opposite the conveying direction and then fastened there. For example, reinforcement ribs which extend on the supporting part in the transverse direction Y could include such recesses.

Alternatively, the fastening position on the supporting part could also be freely selectable by, for example, a groove extending in the supporting part in the transverse direction Y and sliding blocks with threaded bores, into which a screw can engage with the respective module support. In such embodiments, roller modules of different widths can be positioned in any desired manner next to one another.

Preferably, abutment surfaces are provided for (i) the controlled fastening of the individual module supports on the supporting part on each module support and/or on the supporting part which jointly receives the module supports, and (ii) positioning the respective module support relative to the supporting part in the conveying direction X, and/or the transverse direction Y, and/or the vertical direction Z.

On the outer ends (e.g., edges) of a deflection unit, when viewed in the transverse direction, supports may be provided for the laterally outward facing roller axles of the respective outermost roller module. Here, it is also possible to use (preferably identical) module supports, which are also situated farther inward between individual roller modules, wherein the module supports in this edge position receive only the outward facing end of the roller axle of the outermost roller module. However, in this edge position, a slightly different support could also be provided, which in fact, performing the same function as the other module supports which are situated further inward, receives an axle end but which can also have fewer features or other features deviating therefrom. Such an outer support could comprise a connection means (for example, in the form of an abutment pin) for fastening a deflection unit on a belt body. The two outermost supports may be jointly fastened on the supporting part by means of the module supports situated in between and thereby they can also all be rigidly connected to one another, so that the fastening of the two outermost supports—for example, via the abutment pin—on the belt body can be sufficient to arrange or to fasten a deflection unit as a whole on the belt body.

For the controlled leading of a conveyor belt around a deflection unit, a roller group may be formed, by the individual roller modules, with a slight crowning. This prevents the conveyor belt from migrating downward during the operation in the transverse direction Y from a deflection unit. For this purpose, the roller module may protrude slightly more forward, in the conveying direction X and in the middle of the conveyor width, than on the edge. This crowning can be brought about in different ways.

According to one variant, the roller axles of two mutually adjacent roller modules, which themselves are each straight, are arranged so that they are not exactly in alignment, but inclined with respect to one another by an angle which is not equal to 0°. For this purpose, for example, an axle receptacle of a module support, which receives the two axles, can provide sufficient play so that the axle ends held in the common receptacle can be secured with slight inclination toward one another. At least one roller axle is then also slightly inclined with respect to the transverse direction Y. The two module supports, which receive the associated roller module in between and which support the two ends of the roller axle, may be spaced at different spacing, in the conveying direction X, from the supporting part after they are fastened on the supporting part. This can be achieved in a simple manner, for example, by spacers (shims or the like) which are positioned, as needed, for selected module supports between the abutment surfaces described above, or by corresponding machining by cutting of abutment surfaces. Preferably, such a machining occurs on the supporting part for designing identical module supports. In general, it is advantageous to design the module supports of a deflection unit as identical parts, thereby minimizing production and storage costs.

Alternatively, the module supports can define, on opposite sides, axle receptacles which are mutually offset in the conveying direction X. A roller axle inserted on one side in the axle receptacle sits with this offset in conveying direction X with respect to the roller axle of an adjoining additional roller module, which is inserted on the opposite side and into the axle receptacle. This variant has the advantage that the roller axles of all the modules can extend parallel to one another. The crowning is then achieved by positioning the individual roller modules in an ascending or descending step-like pattern when viewed in the conveying direction X.

According to other embodiments, the at least one module support is designed to receive at least one additional roller module, which may be spaced from the first roller module in the vertical direction Z. The additional axle receptacles provided for this additional roller module may correspond, in terms of type and function, to those for the first roller module. Such module supports enable the design of two roller groups that are spaced apart from one another in the vertical direction Z (and preferably also in the conveying direction X) and cumulatively extend over the conveyor width. The first roller group, which is situated higher, forms the front-most or rear-most end of the transport device. The transport device adjoins with a smaller roller radius and correspondingly smaller transfer gap with another transport device. The additional roller group situated beneath is used to deflect the transport belt deflected by the upper roller group further or completely into the opposite direction. When replacing a conventional deflection roller in the field, the second roller group may be arranged for this purpose so that the previously used original conveyor belt or its entire circumference can continue to be used.

The supporting part preferably has a low weight and is made of, for example, aluminum. It can also be a structure of bent plates (for example, made of steel or stainless steel), which offer a high bending stiffness with comparatively small mass.

A deflection unit according to some embodiments of the invention, with the supporting part jointly receiving the module supports and the individual roller modules supported by said module supports, forms a complete and modularly replaceable retrofitting set that can be fastened on a chassis of a belt body via appropriate connection means. The fastening can occur directly by connecting the supporting part to the chassis. Alternatively, the two outermost modules in the transverse direction Y on the edge of a deflection unit, which are also connected to the supporting part, may be connected to the chassis of the belt body. The supporting part may then be used only for the joint reception and supporting of the roller modules with one another, without itself being directly connected to the chassis. (The term "chassis" is used here to stand for a core which is part of the belt body and which substantially shapes or stabilizes said belt body, and which can be designed for the attachment of additional components).

The connection between a deflection unit and chassis can include adjustment means that adjust the spacing between a deflection unit and the chassis of the belt body in conveying direction X. Thereby, the belt tension of a conveyor belt, which is supported by the belt body and running around a deflection unit, can be adjusted. For this purpose, a deflection unit can be arranged in such a manner that it can be shifted in conveying direction X by a predetermined distance relative to the chassis. The adjustment means can include, for example, an adjustment screw that adjusts, within this distance, the relative position of a deflection unit with respect to the chassis so that the conveyor belt supported by the chassis and a deflection unit is sufficiently pretensioned. The pretensioning may be necessary to push the belt with sufficient force onto or against a drive shaft and to transfer the resulting friction force to the belt.

An abutment pin can also be part of the adjustment means and it works together with the adjustment screw. The abutment pin can be arranged on the supporting part or on a module support positioned on the edge of a deflection unit, and, by working together with the adjustment screw, it can adjust the X position of an entire deflection unit. The adjustment means can also simultaneously be used as connection means in order to fasten a deflection unit onto the belt body.

According to some embodiments of the invention, the at least one module support includes a bearing section extending toward the supporting part, the upper side of which in the vertical direction Z is preferably at the same height as the upper side of the roller shell of a roller module supported by the module support. Thereby, the conveyor belt, on its way from the chassis of a belt body to the roller body formed by the individual roller modules, is additionally supported from below for suppressing vibrations and running noise of the conveyor belt and forming, as continuously as possible, an abutment surface.

The bearing section can support, on its upper side, a thin adhesive-connected strip with an abrasion-resistant surface. This enables the production of the module support from a softer and light material such as, for example, aluminum. If necessary, the height offset with respect to the roller shell resulting from the thickness of the strip providing the abrasion-resistant surface can also be compensated by construction.

These and other aspects, advantages, and features of the invention will be apparent from the following description of representative embodiments, considered along with the accompanying drawings.

DESCRIPTION OF REPRESENTATIVE EMBODIMENTS

Figure 1:
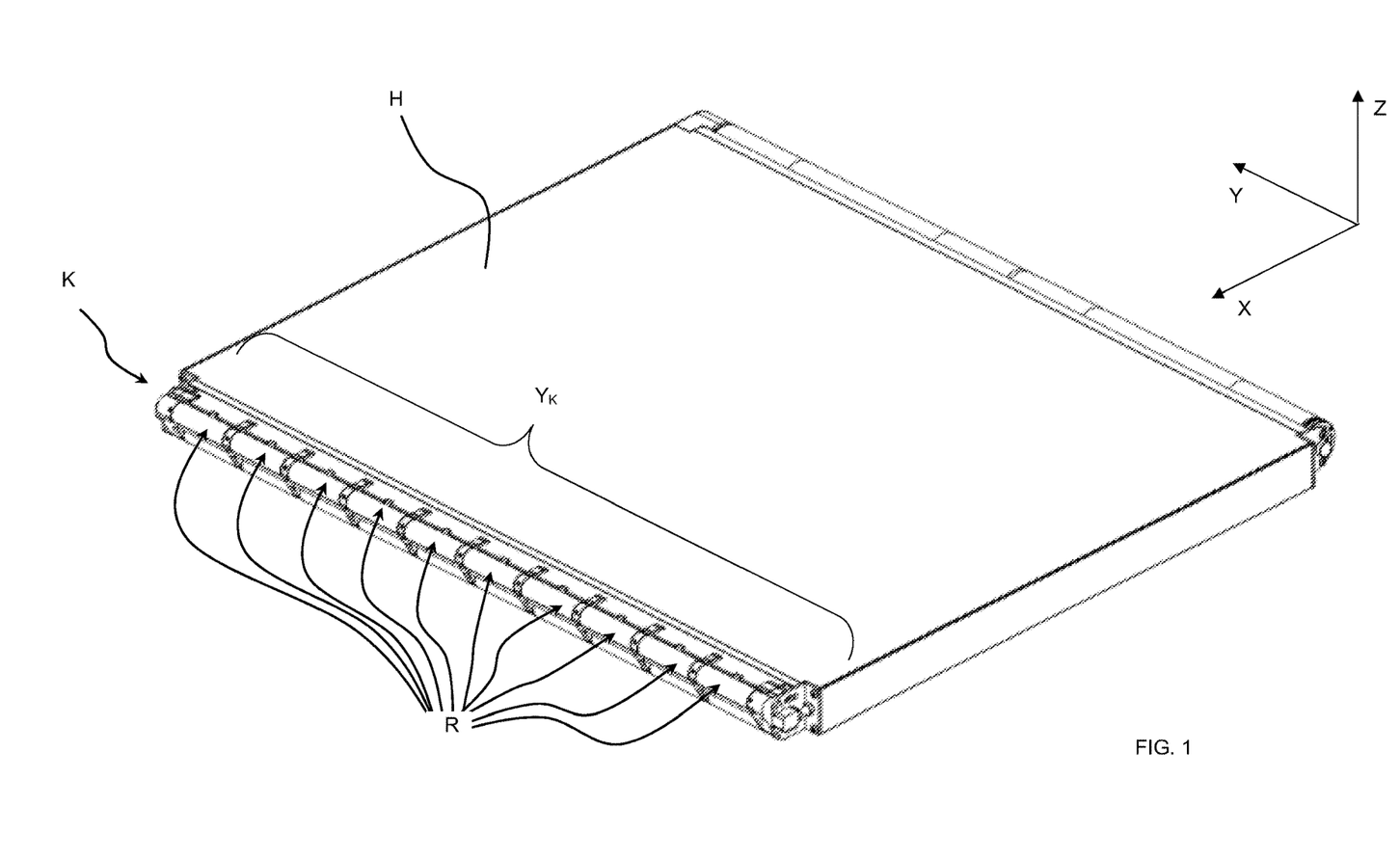
FIG. 1 is a perspective view of a belt body with a deflection unit.

The belt body H according to FIG. 1 extends in a transverse direction Y over a conveyor width $Y_k$. Orthogonally, with respect to the transverse direction Y, the conveying direction X extends horizontally. On a conveyor belt (not represented in FIG. 1), which runs around the belt body H, the products can be conveyed in conveying direction X by the driven conveyor belt. The vertical direction Z extends orthogonally to the transverse direction Y and the conveying direction X.

The belt body H, on its front end when viewed in conveying direction X (alternatively or additionally also on the rear end), supports an example deflection unit K fastened to a chassis of the belt body H in an operating position. The deflection unit K contains a plurality of roller modules arranged next to one another in transverse direction Y, which jointly form a first roller group R. The first roller group R is used to deflect the conveyor belt, which cannot be seen in FIG. 1, and to form, together with an adjoining transport unit, the smallest possible transfer gap.

Figure 2:
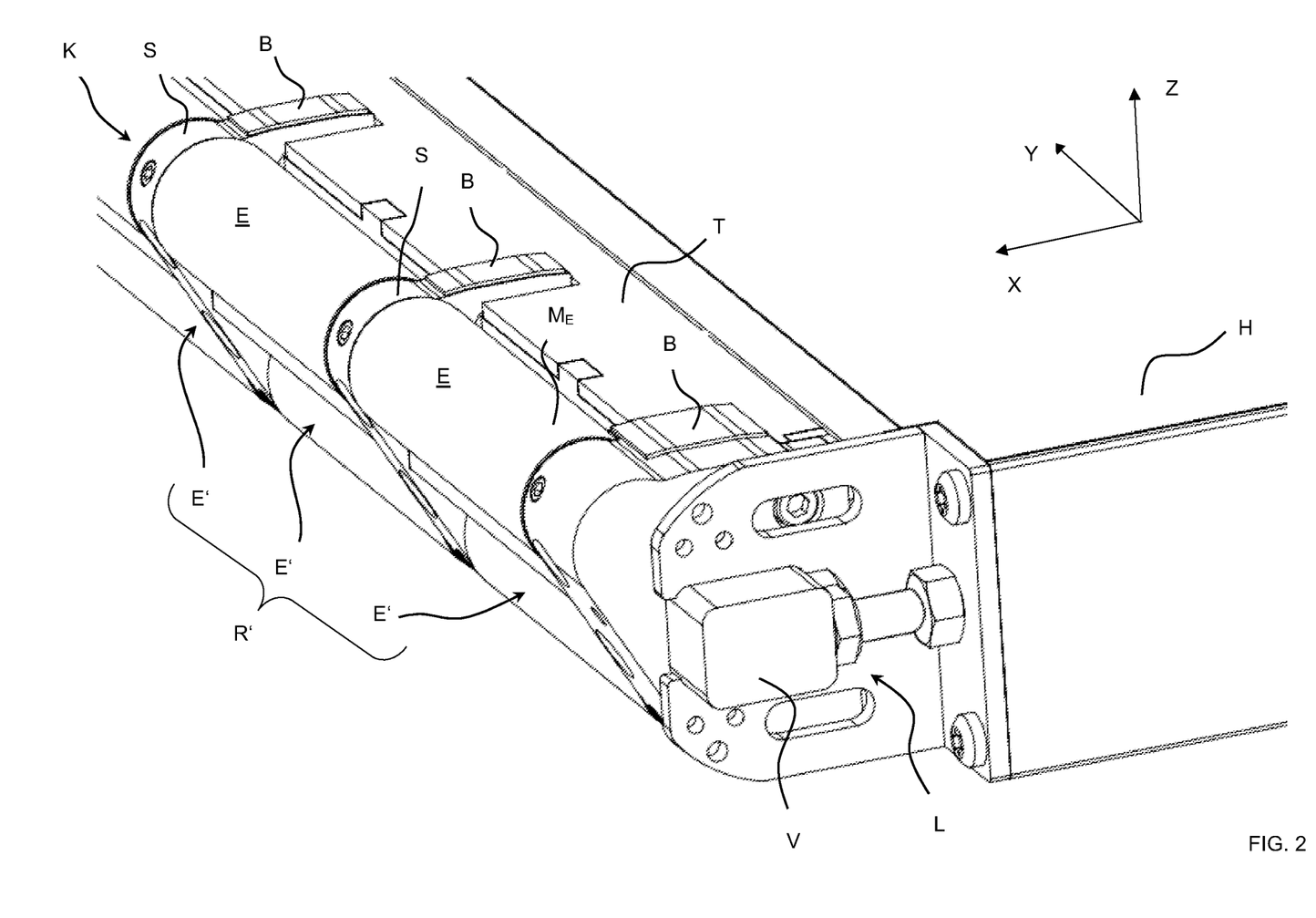
FIG. 2 is an enlarged partial perspective view from FIG. 1.

FIG. 2 shows the deflection unit K arranged on the chassis of the belt body H in an enlarged partial perspective view. Deflection unit K includes a supporting part T extending in a deflection unit longitudinal direction which corresponds to the transverse direction Y when supporting part T is connected in the illustrated operating position. At regular spacings on supporting part T, individual module supports S are arranged, supporting in each case an upper roller module E and a lower roller module E'. In this example embodiment, the lower roller module E' is in each case slightly set back relative to the upper roller module E in the conveying direction X and situated lower in the vertical direction Z. The upper roller modules E jointly form a first roller group R (see FIG. 1); the lower roller modules E' jointly form a second roller group R' (where only some of the roller modules, which overall are part of the respective roller groups R and R', can be seen in FIG. 2).

The supporting part T with the module supports S fastened thereon and with the roller modules E and E', which are in each case held on both sides or supported by the module supports S, is fastened by means of an angle plate via the two outermost (slightly broader) module supports on the chassis of the belt body H. By means of an adjustment means L, designed as an adjustment screw in the illustrated embodiment and works together with an abutment pin V formed on the deflection unit K, the spacing of the deflection unit K from the chassis of the belt body H in the conveying direction X can be adjusted so that a conveyor belt supported by the belt body H and deflected by the deflection unit K can be pretensioned.

Figure 3:
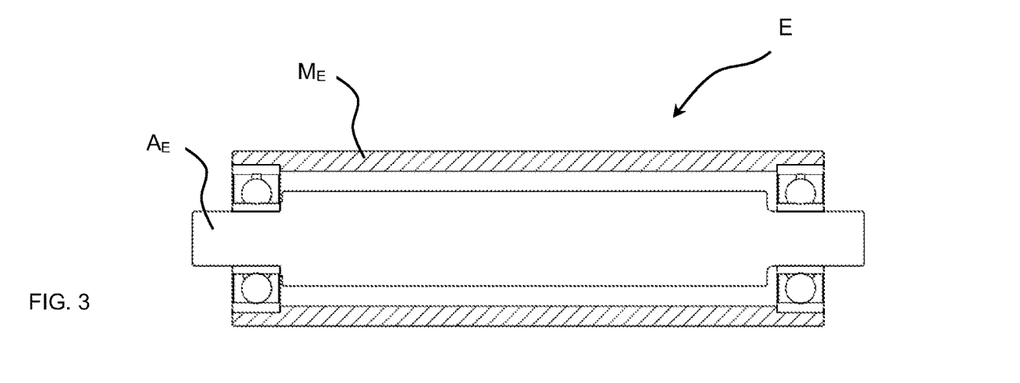
FIG. 3 shows a roller module in cross section.

FIG. 3 is a cross sectional view of roller module E. Here, a cylindrical roller shell $M_E$ is supported by a central roller axle $A_E$ by means of two roller bearings. The ends of the roller axle $A_E$ laterally protrude slightly beyond the roller shell and are provided to be inserted in suitable axle receptacles on the module supports S. When connected in series as shown in FIG. 2 to form the roller group R shown best in FIG. 1, the roller axles $A_E$ of adjacent roller modules E in the series are arranged end-to-end, that is, facing each other, and extend along the deflection unit longitudinal direction corresponding to the illustrated belt body transverse direction Y.

Figure 4:
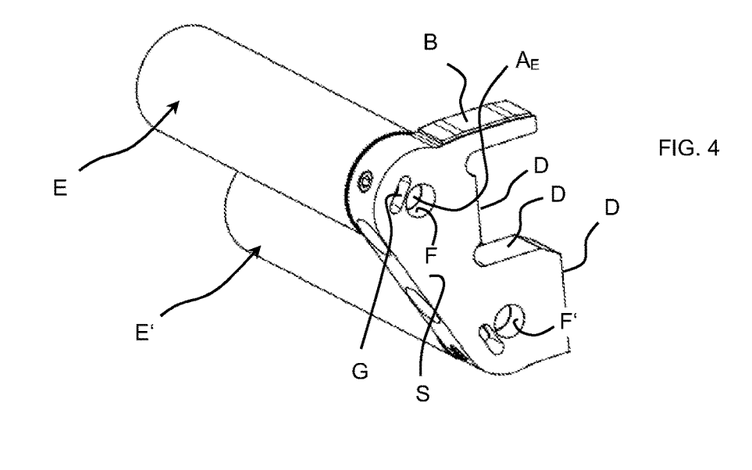
FIG. 4 shows two roller modules supported on one side by a module support.

In FIG. 4, in a perspective representation, it can be seen that two roller modules E and E' are supported on one side by a module support S. An additional module support S of identical design, which supports the two roller modules E and E' on its other end in the same way, is not shown here for the sake of simplicity.

Figure 5:
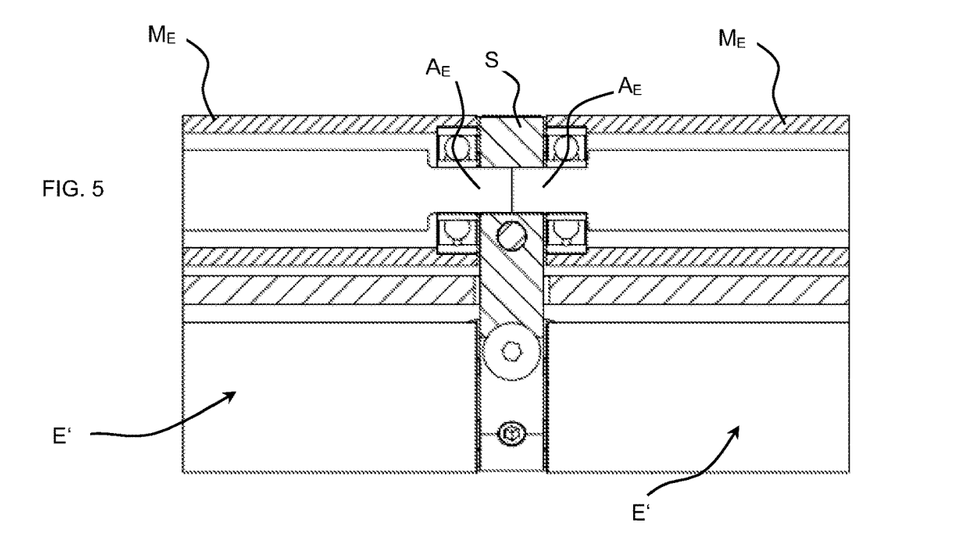
FIG. 5 is a cross-sectional representation of two roller modules supported by a module support.

The module support S defines an upper first axle receptacle F which passes through the module support as a continuous cylindrical borehole in transverse direction Y. An end of the roller axle $A_E$ of the upper roller module E extends (as shown in FIG. 4) into the axle receptacle F. The axle receptacle F is designed so that an additional roller module adjacent to the illustrated upper roller module E can also be inserted into this axle receptacle F (in FIG. 4 on the front side) with an end of its roller axle $A_E$. This is shown in the cross-sectional representation of FIG. 5. For the simultaneous reception of the lower roller module E', the module support S also includes, for roller axles $A_E$ of module E', an identical axle receptacle F' (shown in FIG. 4).

The represented module support S furthermore includes a bearing section B that extends opposite the conveying direction X. The surface of bearing section B lies in vertical direction Z at approximately the same height as the upper side of the roller shell $M_E$ of the upper roller module E that is supported by the module support S. Bearing section B supports the conveyor belt deflected by the first roller group R in the region between the individual roller modules E and E', in the vertical direction, in order to reduce noise and vibrations.

The bearing section B can support, on its upper side, a strip of material with abrasion-resistant surface. This strip of material may, for example, be connected in place with a suitable adhesive. This abrasion-resistant surface enables the production of the module support from a softer and light material such as, for example, aluminum.

Figure 6:
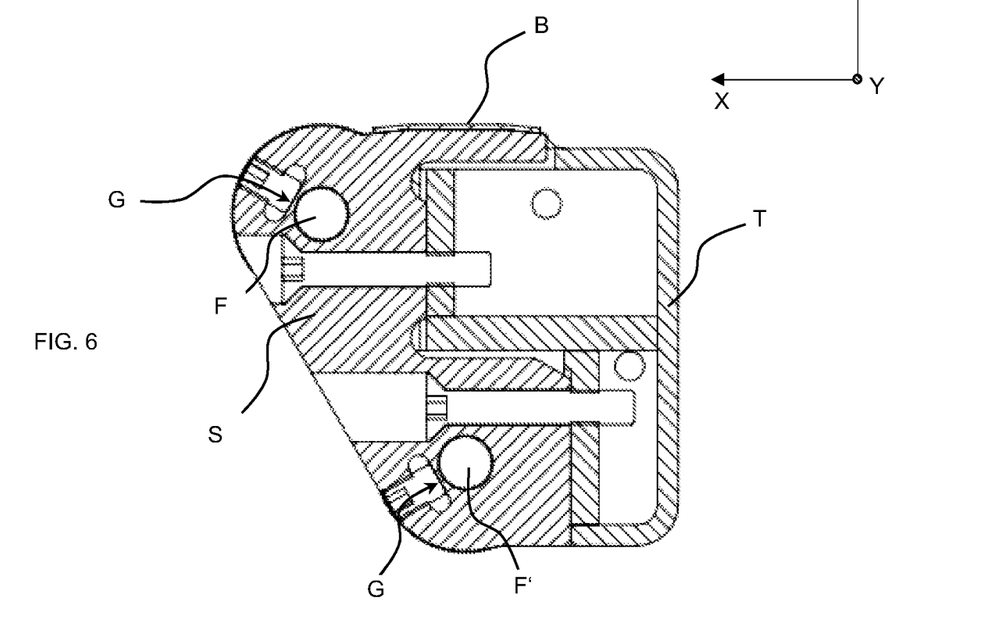
FIG. 6 is a cross-sectional representation of the deflection unit.

With a clamping element G described in greater detail in reference to FIG. 6, the two roller axles jointly protruding into the axle receptacle F can be simultaneously jointly clamped in a rotationally fixed manner relative to the module support S and with only one clamping element G.

Figure 7:
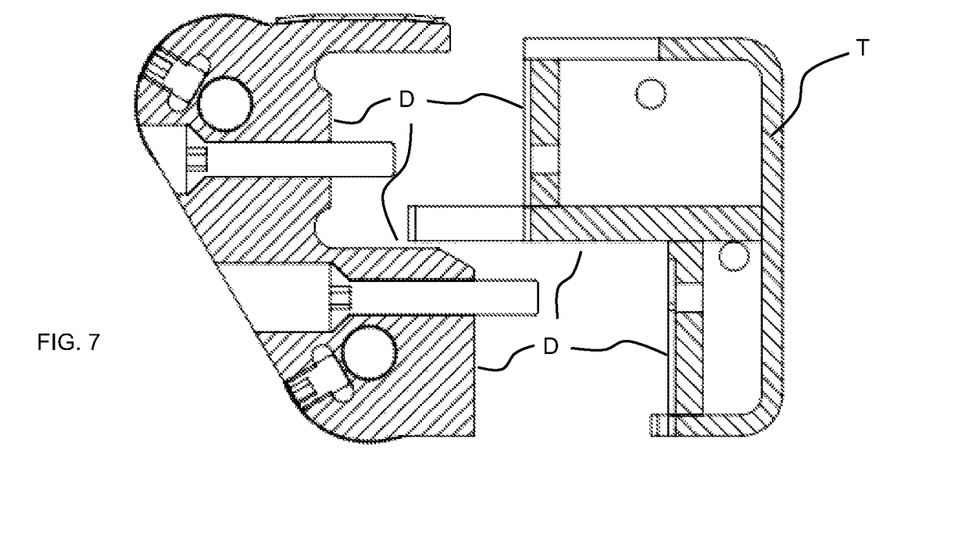
FIG. 7 is a cross-sectional representation of the deflection unit, partially dismantled.

The two cross-sectional representations in FIGS. 6 and 7 show a module support S and a supporting part T in the interconnected state (FIG. 6) and in the separate state (FIG. 7). The supporting part T formed by the angle plate parts is provided with abutment surfaces D, which interact with abutment surfaces D of the module support S when the two components are connected to one another, for example, by being screwed together. For this purpose, the module support S can be moved opposite the conveying direction X in the direction of the supporting part T and up to abutment with said supporting part T. Here, the abutment surfaces D position the two components relative to one another. By means of the shims positioned between interacting abutment surfaces D, the relative position of the module support S relative to the supporting part S can be determined in a changed manner, for example, with respect to the conveying direction X. Thereby, the crowning described above can be provided. Alternatively, the abutment surfaces D (preferably those on the supporting part T) can be machined (for example, milled) correspondingly at different depths in order to maintain the desired different relative positions.

By means of a material recess in the proximity of the axle receptacle F or F', a clamping element G designed as thin section is formed, in the form of a thin, slightly flexible wall. The wall can be loaded with a force on a side facing away from the axle receptacle F or F' by means of a tensioning means, for example, a headless screw. Thereby, the wall or thin section is deformed in the direction of the roller axles introduced into the axle receptacle F or F', so that the roller axles are clamped in a rotationally fixed manner in the receptacle. Advantageously, a single tensioning means is sufficient here for simultaneous securing two roller axles adjacent to each other in direction Y.

Figure 8:
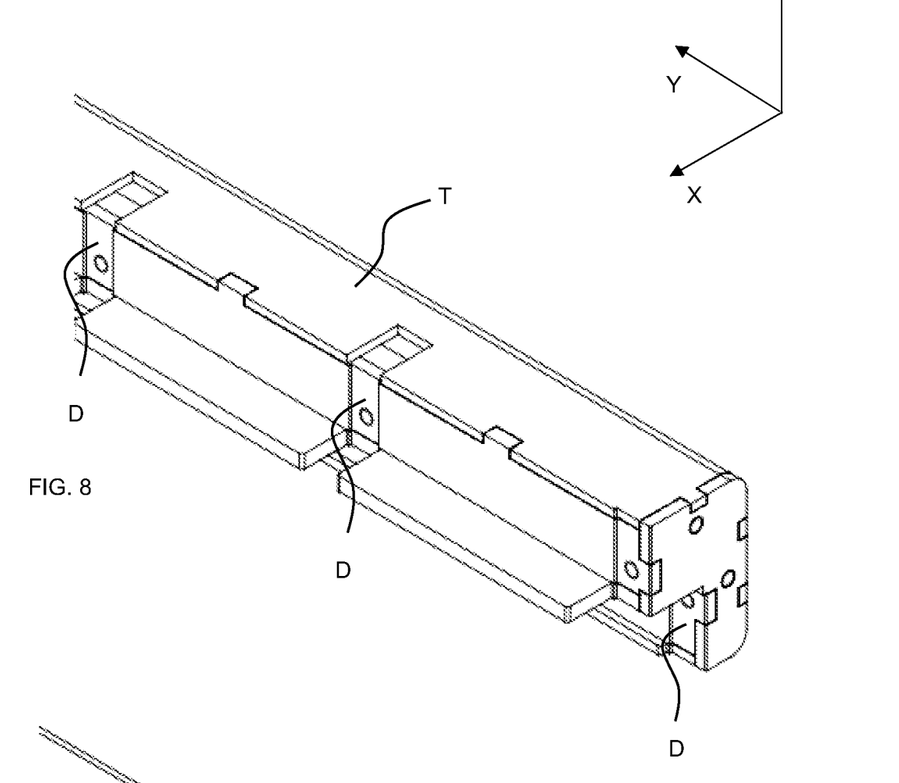
FIG. 8 is a partial perspective view of the supporting part.
Figure 9:
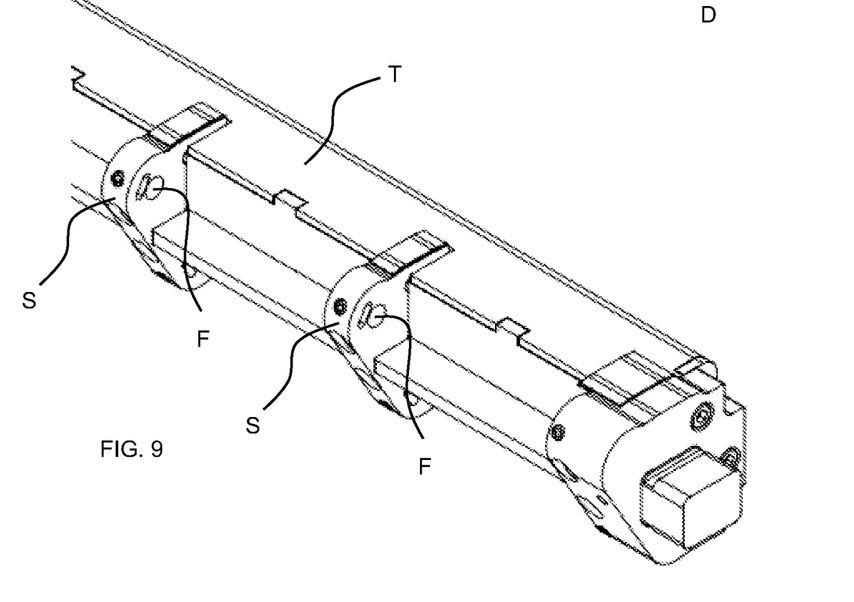
FIG. 9 shows the supporting part according to FIG. 8 with inserted module supports.
Figure 10:
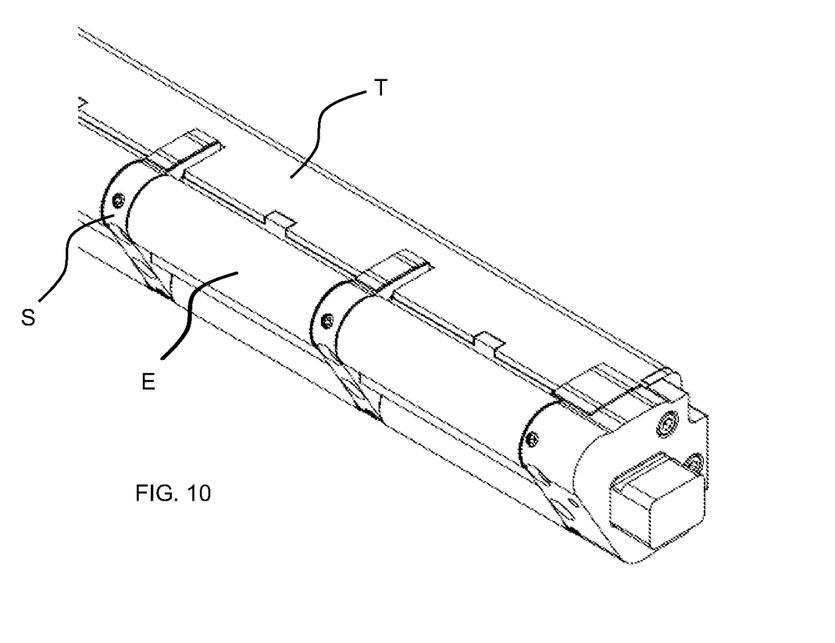
FIG. 10 shows the supporting part according to FIG. 9 with associated roller modules.

FIG. 8 shows an end section of the supporting part T according to an embodiment of the invention. Here, at regular spacings in transverse direction Y, insertion positions with appropriate abutment surfaces D for receiving in each case a module support S are provided. FIG. 9 shows the supporting part T according to FIG. 8 with module supports S already inserted. In FIG. 10, the roller modules E inserted between the roller supports can also be seen.

The mounting of the deflection unit K, according to an implementation of the invention, advantageously occurs so that the roller modules E and E' are arranged between the associated module supports S. This joint arrangement is then moved, using the convention of FIGS. 6 and 7, opposite the conveying direction X and onto the supporting part T and connected by screwing the individual module supports S to the common supporting part T. The deflection unit K thus formed is then fastened as a whole on the chassis of a belt body H. After a conveyor belt, which runs around the belt body H and the deflection unit K, has been pulled, the position of the deflection unit K, in the conveying direction X relative to the chassis, can be adjusted in order to generate the correct belt tension.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

| List of reference numerals | |
|---|---|
| $A_E$ | Roller axle |
| B | Bearing section |
| D | Abutment surface |
| E, E' | Roller module |
| F, F' | Axle receptacle |
| G | Clamping element |
| H | Belt body |
| K | Modular deflection unit |
| $Y_k$ | Conveyor width |
| L | Connection means as adjustment means |
| $M_E$ | Roller shell |
| R, R' | Roller group |
| S | Module support |
| T | Supporting part |
| V | Connection means as abutment pin |
| X | Conveying direction |
| Y | Transverse direction |
| Z | Vertical direction |

The invention claimed is:

1. A modular deflection unit for a belt-type conveyor, the modular deflection unit including:
   (a) a supporting part extending in a deflection unit longitudinal direction, the supporting part adapted to be connected to a belt body in an operating position in which the deflection unit longitudinal direction extends in a transverse direction of the belt body, the transverse direction of the belt body lying orthogonal to a conveying direction associated with the belt body;
   (b) a first roller group that includes a series of at least two roller modules, each roller module including a respective roller axle and a roller shell rotatably mounted on the respective roller axle, wherein each roller axle is oriented end-to-end with the roller axle of an adjacent roller module in the series of at least two roller modules so as to extend along the deflection unit longitudinal direction;
   (c) for each respective pair of two adjacent roller modules in the series of at least two roller modules, at least one module support detachably connected to the supporting part and arranged between the respective pair of two adjacent roller modules, each module support defining an axle receptacle that is adapted to receive and support an end of at least one roller axle of the respective pair of two adjacent roller modules; and
   (d) wherein the axle receptacle of a respective module support includes a clamping element adapted to be loaded by a tensioning element to clamp the end of at least one of the roller axles in a rotationally fixed manner in the respective module support.

2. The modular deflection unit of claim 1 wherein the axle receptacle of a respective module support comprises a borehole extending at least partially through the respective module support in the deflection unit longitudinal direction.

3. The modular deflection unit of claim 1 wherein the axle receptacle of a respective module support is adapted to receive and jointly secure a respective end of two of the roller axles.

4. The modular deflection unit of claim 1 wherein the clamping element comprises a reversibly deformable wall section of the axle receptacle of the respective module support and the tensioning element comprises a screw located in the respective module support with an inner end of the screw adjacent to the wall section.

5. The modular deflection unit of claim 1 wherein the supporting part defines at least one abutment surface for each module support, the at least one abutment surface arranged to position the respective module support relative to the supporting part in at least one direction.

6. A modular deflection unit for a belt-type conveyor, the modular deflection unit including:
   (a) a supporting part extending in a deflection unit longitudinal direction, the supporting part adapted to be connected to a belt body in an operating position in which the deflection unit longitudinal direction extends in a transverse direction of the belt body, the transverse direction of the belt body lying orthogonal to a conveying direction associated with the belt body;
   (b) a first roller group that includes a series of at least two roller modules, each roller module including a respective roller axle and a roller shell rotatably mounted on the respective roller axle, wherein each roller axle is oriented end-to-end with the roller axle of an adjacent roller module in the series of at least two roller modules so as to extend along the deflection unit longitudinal direction;
   (c) for each respective pair of two adjacent roller modules in the series of at least two roller modules, at least one module support detachably connected to the supporting part and arranged between the respective pair of two adjacent roller modules, each module support defining an axle receptacle that is adapted to receive and support an end of at least one roller axle of the respective pair of two adjacent roller modules; and
   (d) wherein the series of at least two roller modules include at least one middle roller module, a first end roller module at a first end of the series of roller modules, and a second end roller module at a second end of the series of roller modules and wherein when the supporting part is connected to the belt body in the operating position the at least one middle roller module is positioned further in the conveying direction than the first end roller module and the second end roller module, thereby forming a crowning along the series of roller modules.

7. The modular deflection unit of claim 6 wherein the crowning is formed by at least one of:
   (a) two adjacent roller axles are secured with respect to one another at an angle which is not equal to 0°,
   (b) the at least one module support arranged between the respective pair of two adjacent roller modules supports each roller axle of the two adjacent roller modules at different spacings from the supporting part, and
   (c) one of the roller modules is supported at a first roller axle end in a first axle receptacle and is supported at a second roller axle end in a second axle receptacle, wherein a spacing between the first axle receptacle and the supporting part is different from a spacing between the second axle receptacle and the supporting part.

8. The modular deflection unit of claim 6 mounted on a conveyor for transporting goods, wherein the conveyor includes the belt body and the supporting part is connected to the belt body in the operating position.

9. The modular deflection unit of claim 6 mounted on a scale, wherein the scale includes the belt body and the supporting part is connected to the belt body in the operating position.

10. A modular deflection unit for a belt-type conveyor, the modular deflection unit including:
    (a) a supporting part extending in a deflection unit longitudinal direction, the supporting part adapted to be connected to a belt body in an operating position in which the deflection unit longitudinal direction extends in a transverse direction of the belt body, the transverse direction of the belt body lying orthogonal to a conveying direction associated with the belt body;
    (b) a first roller group that includes a series of at least two roller modules, each roller module including a respective roller axle and a roller shell rotatably mounted on the respective roller axle, wherein each roller axle is oriented end-to-end with the roller axle of an adjacent roller module in the series of at least two roller modules so as to extend along the deflection unit longitudinal direction;
    (c) for each respective pair of two adjacent roller modules in the series of at least two roller modules, at least one module support detachably connected to the supporting part and arranged between the respective pair of two adjacent roller modules, each module support defining an axle receptacle that is adapted to receive and support an end of at least one roller axle of the respective pair of two adjacent roller modules; and
    (d) a connector adapted to detachably fasten the modular deflection unit to a chassis of the belt body; and
    (e) an adjustment mechanism adapted for, when the supporting part is connected to the belt body in the operating position, adjusting a spacing of the modular deflection unit from the chassis of the belt body in the conveying direction.

11. The modular deflection unit of claim 10 wherein at least one module support includes a bearing section extending toward the supporting part, the bearing section defining an upper side that aligns, in a height direction of the modular deflection unit, with an upper side of the roller shell of a roller module that is supported by the at least one module support.

12. The modular deflection unit of claim 11 wherein the supporting part defines at least one abutment surface for each module support, the at least one abutment surface arranged to position the respective module support relative to the supporting part in at least one direction.

13. A modular deflection unit for a belt-type conveyor, the modular deflection unit including:
    (a) a supporting part extending in a deflection unit longitudinal direction, the supporting part adapted to be connected to a belt body in an operating position in which the deflection unit longitudinal direction extends in a transverse direction of the belt body, the transverse direction of the belt body lying orthogonal to a conveying direction associated with the belt body;
    (b) a first roller group that includes a series of at least two roller modules, each roller module including a respective roller axle and a roller shell rotatably mounted on the respective roller axle, wherein each roller axle is oriented end-to-end with the roller axle of an adjacent roller module in the series of at least two roller modules so as to extend along the deflection unit longitudinal direction;
    (c) for each respective pair of two adjacent roller modules in the series of at least two roller modules, at least one module support detachably connected to the supporting part and arranged between the respective pair of two adjacent roller modules, each module support defining an axle receptacle that is adapted to receive and support an end of at least one roller axle of the respective pair of two adjacent roller modules; and
    (d) wherein the at least one module support further defines at least one additional axle receptacle that is arranged to receive an additional roller axle of at least one additional roller module of an additional roller group that, when the supporting part is in the operating position on the belt body, is arranged below the first roller group in a vertical direction that is orthogonal to the transverse direction and the conveying direction.

14. The modular deflection unit of claim 13 wherein the axle receptacle of a respective module support is adapted to receive and jointly secure a respective end of two of the roller axles.

15. The modular deflection unit of claim 13 mounted on a conveyor for transporting goods, wherein the conveyor includes the belt body and the supporting part is connected to the belt body in the operating position.

16. The modular deflection unit of claim 13 mounted on a scale, wherein the scale includes the belt body and the supporting part is connected to the belt body in the operating position.

* * * * *